United States Patent
Kleine-Doepke et al.

(10) Patent No.: US 9,872,592 B2
(45) Date of Patent: Jan. 23, 2018

(54) CYCLONIC SEPARATION DEVICE

(71) Applicant: KONINKLIJKE PHILIPS N.V., Eindhoven (NL)

(72) Inventors: Bastian Cornelis Kleine-Doepke, Eindhoven (NL); Johannes Tseard Van Der Kooi, Eindhoven (NL); Bart Meulenbeld, Eindhoven (NL); Arnoldus Cornelis Wessels, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/784,371

(22) PCT Filed: Jan. 5, 2015

(86) PCT No.: PCT/EP2015/050019
§ 371 (c)(1),
(2) Date: Oct. 14, 2015

(87) PCT Pub. No.: WO2015/113779
PCT Pub. Date: Aug. 6, 2015

(65) Prior Publication Data
US 2016/0353954 A1    Dec. 8, 2016

(30) Foreign Application Priority Data
Jan. 28, 2014  (EP) ..................... 14152832

(51) Int. Cl.
*F01N 3/06*    (2006.01)
*A47L 9/16*    (2006.01)
(Continued)

(52) U.S. Cl.
CPC ............ *A47L 9/1658* (2013.01); *B01D 45/12* (2013.01); *B01D 45/16* (2013.01); *B01D 50/002* (2013.01);
(Continued)

(58) Field of Classification Search
CPC ..... A47L 9/1658; A47L 9/1608; B04C 5/181; B04C 5/103; B04C 5/04; B01D 45/16; B01D 50/002; B01D 45/12
See application file for complete search history.

(56) References Cited

U.S. PATENT DOCUMENTS 1,408,693 A * 3/1922 Deily ................. B04C 5/04
                                                  55/339
2,846,024 A * 8/1958 Bremi ............... B04C 5/04
                                                  55/413
(Continued)

FOREIGN PATENT DOCUMENTS

EP    0371828 A1    6/1990
EP    1136028 A2    9/2001
(Continued)

*Primary Examiner* — Dung H Bui

(57) ABSTRACT

A separation device for separating a cyclone chamber from a collection chamber of a cyclonic separator has a guide member that includes a leading end, a trailing end, and a guide surface. The guide surface guides debris entrained in an airflow in the cyclone chamber in a helical path about an axis of the separation device and into the collection chamber. The guide surface extends about the axis of the separation device through an angle of less than 360 degrees for allowing debris in the cyclone chamber to also pass into the collection chamber from the cyclone chamber in an axial direction. The leading end of the guide member is at an angle between 30° and 60° towards the cyclone chamber with respect to the axis of the separation device to promote a helical flow of air and debris flowing over the guide surface.

20 Claims, 6 Drawing Sheets

(51) Int. Cl.
  *B01D 45/16* (2006.01)
  *B01D 50/00* (2006.01)
  *B01D 45/12* (2006.01)
  *B04C 5/103* (2006.01)
  *B04C 5/181* (2006.01)
  *B04C 5/04* (2006.01)

(52) U.S. Cl.
  CPC .............. *B04C 5/103* (2013.01); *B04C 5/181* (2013.01); *A47L 9/1608* (2013.01); *B04C 5/04* (2013.01)

(56) References Cited

U.S. PATENT DOCUMENTS

| | | | | |
|---|---|---|---|---|
| 3,513,642 | A * | 5/1970 | Cornett | B01D 50/00 209/23 |
| 3,953,184 | A * | 4/1976 | Stockford | B04C 5/04 55/458 |
| 4,011,068 | A * | 3/1977 | Llewelyn | B04C 5/04 110/101 R |
| 4,260,401 | A * | 4/1981 | Truhan | B04C 5/13 55/339 |
| 4,406,677 | A * | 9/1983 | Obermeier | B01D 45/12 209/710 |
| 5,275,730 | A * | 1/1994 | Keuschnigg | B04C 5/13 138/39 |
| 6,562,093 | B2 | 5/2003 | Oh | |
| 2005/0269258 | A1* | 12/2005 | Keuschnigg | B04C 5/13 210/512.1 |
| 2006/0053757 | A1 | 3/2006 | Han | |
| 2006/0236663 | A1 | 10/2006 | Oh | |
| 2007/0095034 | A1* | 5/2007 | Han | A47L 9/1608 55/459.3 |
| 2009/0211212 | A1* | 8/2009 | Hyun | A47L 9/1608 55/423 |
| 2009/0265883 | A1* | 10/2009 | Reed, Jr. | A47L 9/1608 15/353 |
| 2009/0282791 | A1* | 11/2009 | Lang | A47L 9/1608 55/326 |
| 2009/0300872 | A1* | 12/2009 | Griffith | A47L 9/1658 15/347 |
| 2010/0146916 | A1* | 6/2010 | Schneider | B01D 29/114 55/337 |
| 2010/0154367 | A1* | 6/2010 | Luo | A47L 5/362 55/337 |
| 2014/0196605 | A1* | 7/2014 | Morgan | A47L 9/1633 95/271 |
| 2014/0373307 | A1* | 12/2014 | Van Der Kooi | A47L 9/0081 15/353 |

FOREIGN PATENT DOCUMENTS

| | | |
|---|---|---|
| EP | 1199023 A1 | 4/2002 |
| FR | 2875119 A1 | 3/2006 |
| JP | 5732648 U | 2/1982 |
| JP | 2004105364 A | 4/2004 |
| JP | 2006130034 A | 5/2006 |
| JP | 2012016500 A | 1/2012 |
| KR | 20030056777 A | 7/2003 |
| WO | 2012146616 A1 | 11/2012 |

* cited by examiner

CYCLONIC SEPARATION DEVICE

This application is the U.S. National Phase application under 35 U.S.C. §371 of International Application No. PCT/EP2015/050019, filed on Jan. 1, 2015, which claims the benefit of European Application No. 14152832.3 filed on Jan. 28, 2014. These applications are hereby incorporated by reference herein.

FIELD OF THE INVENTION

The present invention relates to a separation device, and to a cyclonic separator comprising the same. The present invention also relates to a vacuum cleaner comprising a cyclonic separator according to the invention.

BACKGROUND OF THE INVENTION

Cyclonic separators are commonly used to separate dust and debris from the suction airflow of vacuum cleaners. Known cyclonic separators comprise a cyclone chamber with an air inlet and an air outlet. The air inlet is angled obliquely to the central axis of the cyclone chamber so that when air enters the cyclone chamber a vortex of air is formed. Dirt and debris entrained in the airflow are urged against the peripheral wall of the cyclone chamber under centrifugal forces, which causes the dust and debris to fall to the bottom of the cyclone chamber. The clean airflow, which is now separated from the dust and debris, is then exhausted through the air outlet and the dust and debris stored in the cyclone chamber.

U.S. Pat. No. 6,562,093 shows a cyclonic separator having a dust bin that is in-line with a cyclone chamber to save space. The dust bin is separated from the cyclone chamber by a separation device to prevent dust and debris that have accumulated in the dust bin from being blown back into the cyclone chamber.

US2006053757 shows a vacuum cleaner having a cyclone dust-collecting apparatus including a cyclone body having a suction part through which air is drawn in and a discharge part through which the air is discharged; a grill connected to the discharge part, for filtering the air; a dirt receptacle connected to the cyclone body, for collecting dirt separated from the air which is drawn in through the suction part; and a downstream guide part for preventing dirt collected in the dirt receptacle from being scattered, and, of the dirt included in the drawn-in air, downward guiding a dirt having at least one of a predetermined weight and a predetermined size in a spiral direction by a flux of the air to the dirt receptacle.

SUMMARY OF THE INVENTION

It is an object of the invention to provide for a more efficient debris collection. The invention is defined by the independent claims. The dependent claims define advantageous embodiments.

According to one aspect of the present nvention, there is provided a separation device for separating a cyclone chamber from a collection chamber of a cyclonic separator, the separation device having a guide member that has a leading end, a trailing end, and a guide surface for guiding debris entrained in an airflow in the cyclone chamber in a helical path about an axis of the separation device and into the collection chamber, wherein the guide surface extends about the axis of the separation device through an angle (or first angle) of less than 360 degrees for allowing debris in the cyclone chamber to also pass into the collection chamber from the cyclone chamber in an axial direction. The leading end of the guide member is at an angle $\alpha$ between 30 degrees and 60 degrees towards the cyclone chamber with respect to the axis of the separation device, The leading end may promote a helical flow of air and debris flowing over the guide surface and may form a peripheral edge of a flow path through the separation device between the cyclone chamber and collection chamber. In one embodiment, the angle $\alpha$ is preferably substantially 45 degrees. Debris can be removed from the cyclone chamber and collected in the collection chamber without first being deposited on the guide surface and so the debris may be collected more efficiently. Furthermore, the guide surface extending less than 360 degrees about the axis of the separation device allows for the radial extent of a flow path through the separation device to be configured such that larger dirt and debris, for example, hair and fluff, will always be acted on by the air flowing into the collection chamber. Therefore, such larger dirt and debris will be prevented from flowing from the collection chamber to the cyclone chamber.

Advantageously, the separation device has an opening both in a radial direction for allowing debris entrained in an airflow that flows in a helical path about the axis (X-X) to exit the separation device, and in an axial direction for allowing debris to exit the separation device under the effect of gravity.

In one embodiment, at least a portion of the guide surface follows a substantially helical path about the axis of the separation device. The helical path of the guide surface promotes a helical flow of air and debris flowing over the guide surface.

In one embodiment, at least a portion of the guide surface is angled towards the cyclone chamber with respect to the axis of the separation device and the angle $\alpha$ between said portion of the guide surface and the axis of the separation device continuously increases about the axis of the separation device in a direction from the leading end to the trailing end of the guide member from a first value $\alpha_1$ to second value $\alpha_2$. This can allow for the shape of the guide surface to correspond to the shape of the helical flow path of air travelling from the cyclone chamber to the collection chamber so that the helical flow path of the flow is not disrupted. In addition, the separation device can be configured to take up less space in the axial direction of the cyclone chamber.

The trailing end of the guide member may extend substantially perpendicular to the axis of the separation device. Therefore, the trailing end may promote a helical flow of air and debris flowing over the guide surface from the leading end to the trailing end and may form a peripheral edge of a flow path through the separation device between the cyclone chamber and collection chamber.

In one embodiment, the portions of the leading and trailing ends of the guide member that are proximate to the axis of the separation device overlap in the axial direction of the separation device. This can allow for the separation device to take up less space in the axial direction of the cyclone chamber.

In one embodiment, the separation device comprises a support member and the guide surface extends from a portion of the periphery of the support member.

In one embodiment, the guide surface extends continuously about the axis of the separation device through an angle of between 270 degrees and 340 degrees and preferably through an angle of substantially 315 degrees.

In one embodiment, the separation device comprises a peripheral wall. The peripheral wall may be configured to sit flush to a peripheral wall of the cyclone chamber and/or a peripheral wall of the collection chamber. Therefore, the separation device is constrained from tilting about its axis relative to the cyclone chamber and/or collection chamber.

In one embodiment, the separation device comprises a blocking member that extends into the collection chamber. The blocking member prevents air in the collection chamber from flowing across the centre of the collection chamber and so encourages a cyclonic flow path of the air in the collection chamber.

According to the present invention, there is also provided a cyclonic separator comprising the separation device according to the invention.

According to the present invention, there is also provided a vacuum cleaner comprising the cyclonic separator according to the invention.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
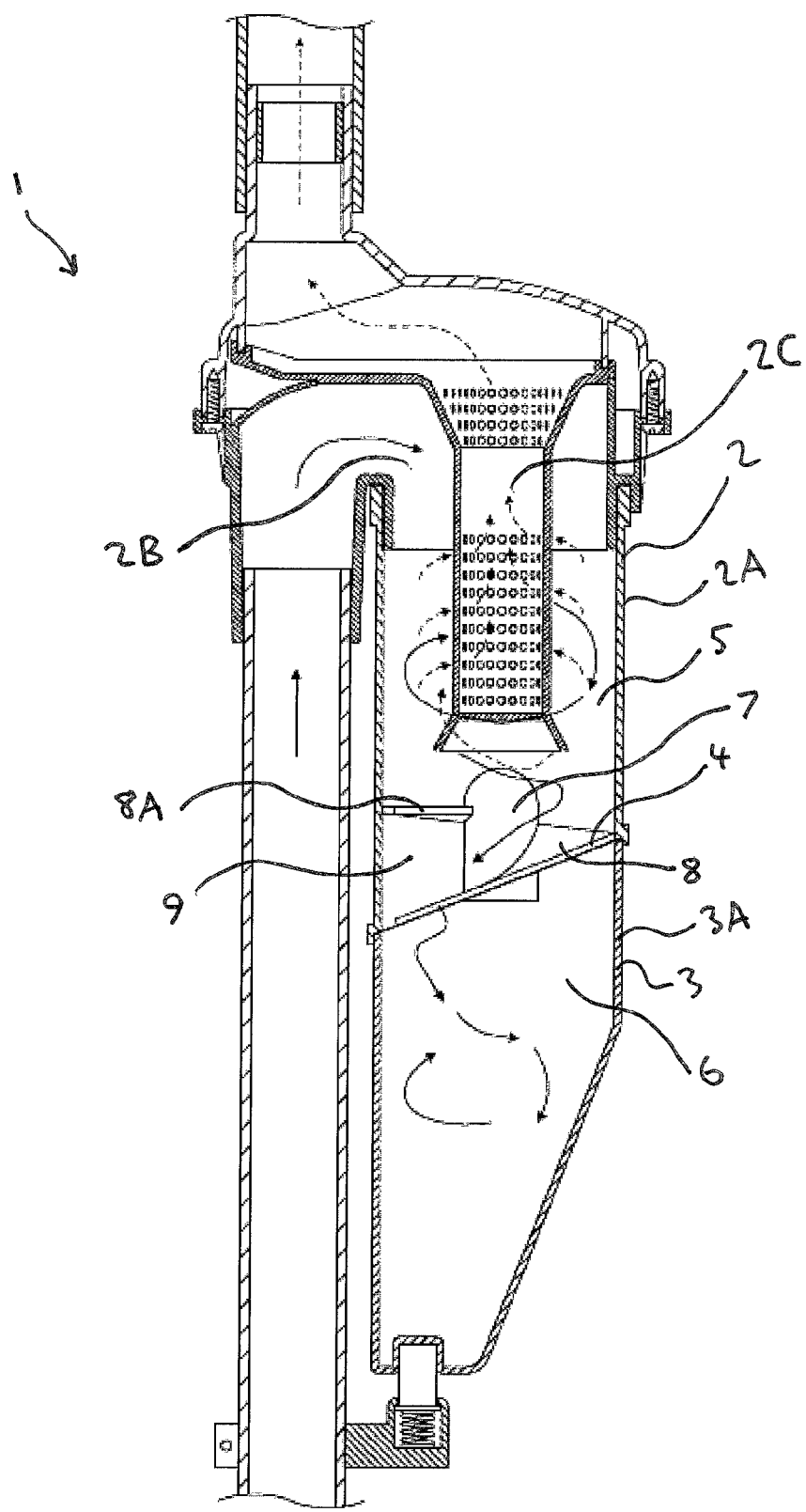
FIG. 1 is a cross-sectional side view of a known cyclonic separator.
Figure 2:
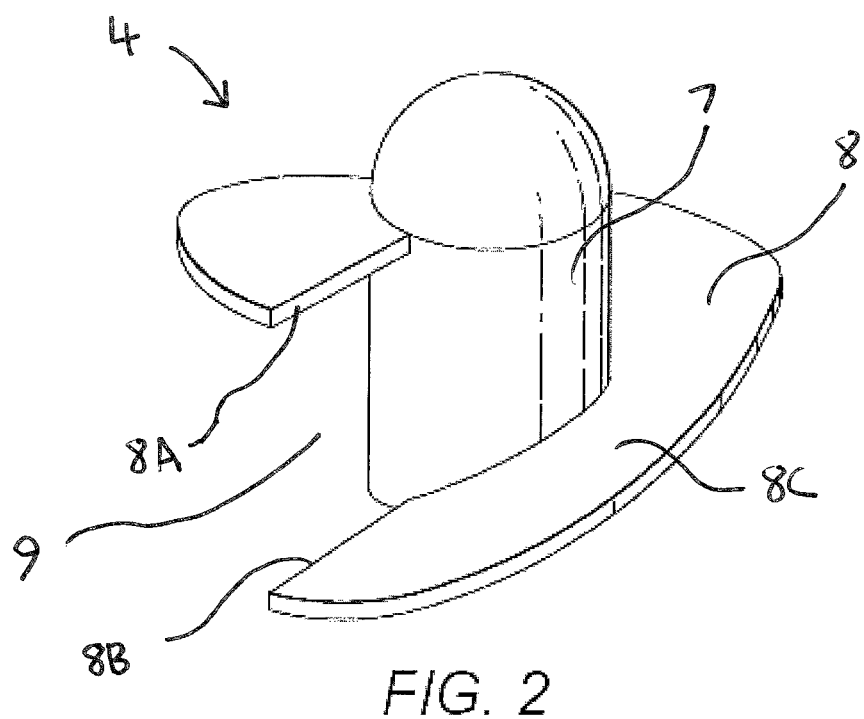
FIG. 2 is a perspective view of the separation device of the cyclonic separator of FIG. 1.
Figure 3:
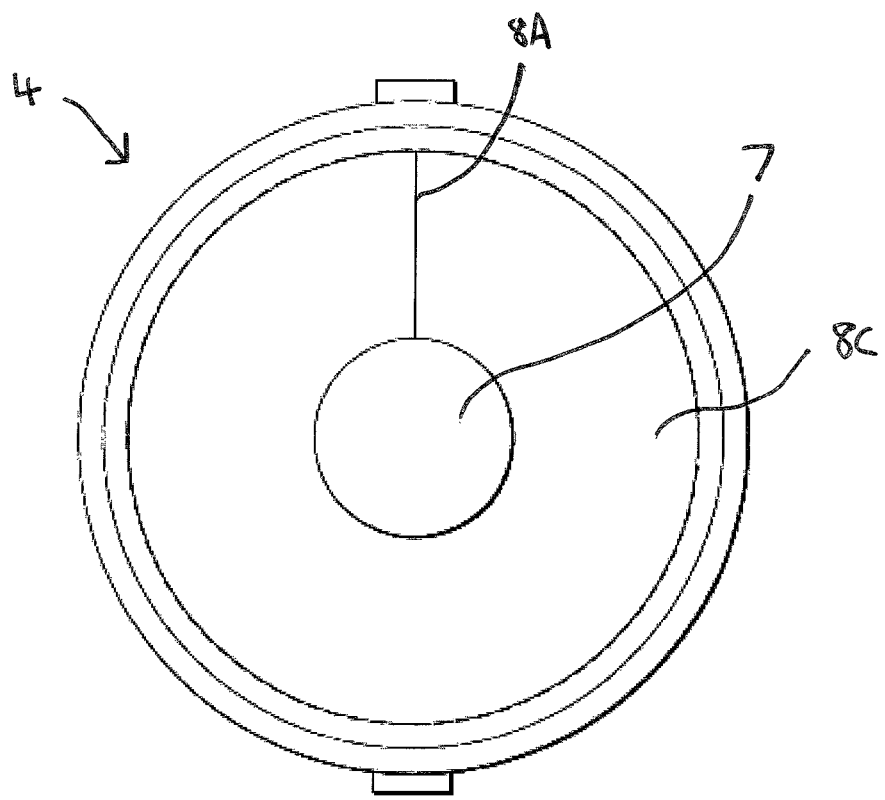
FIG. 3 is a top view of the separation device of FIG. 2.
Figure 4:
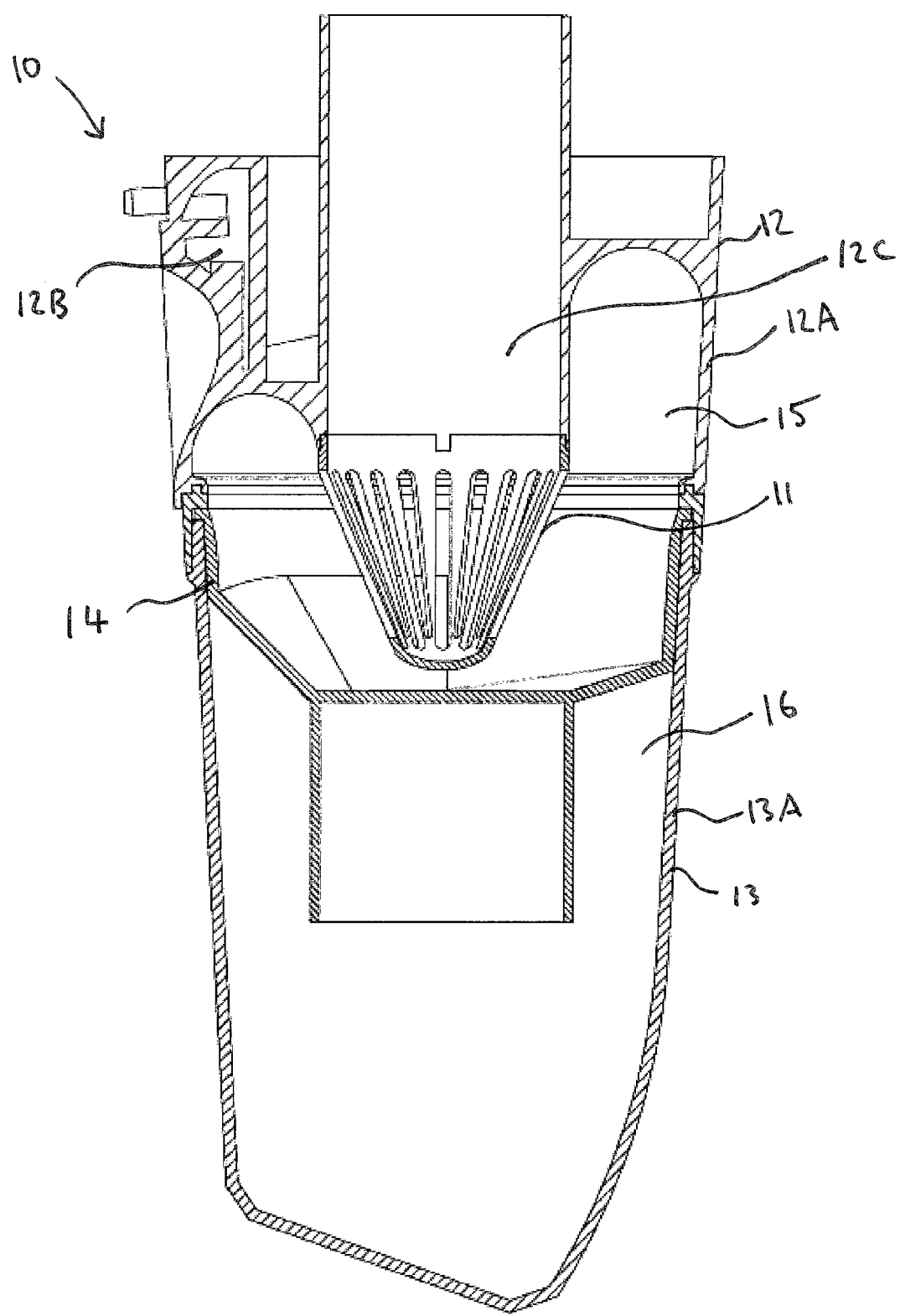
FIG. 4 is a cross-sectional side view of a cyclonic separator for a vacuum cleaner comprising a separation device according to an embodiment of the invention.
Figure 5:
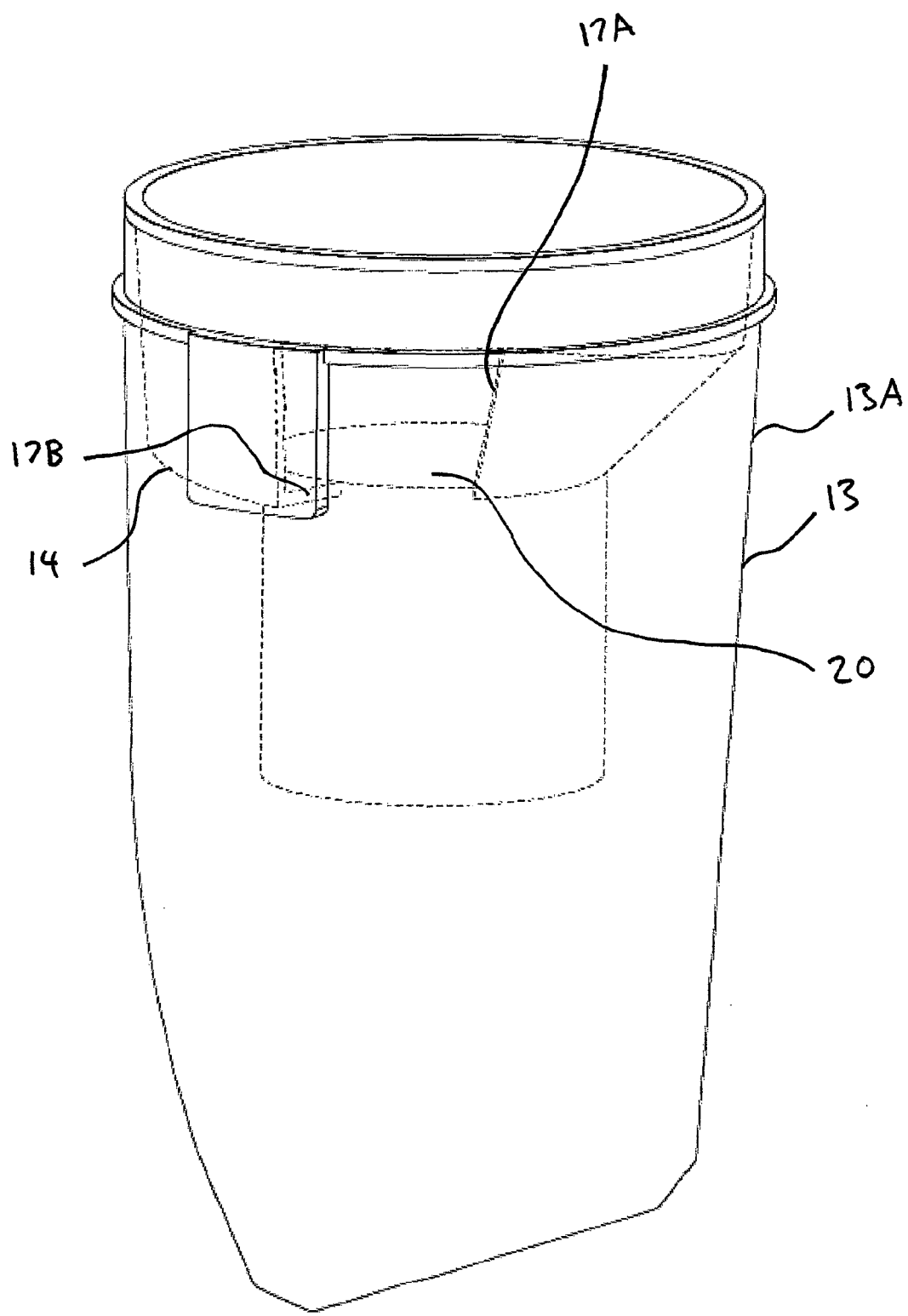
FIG. 5 is a perspective view of the separation device of FIG. 4 in place on a dust bin.
Figure 6:
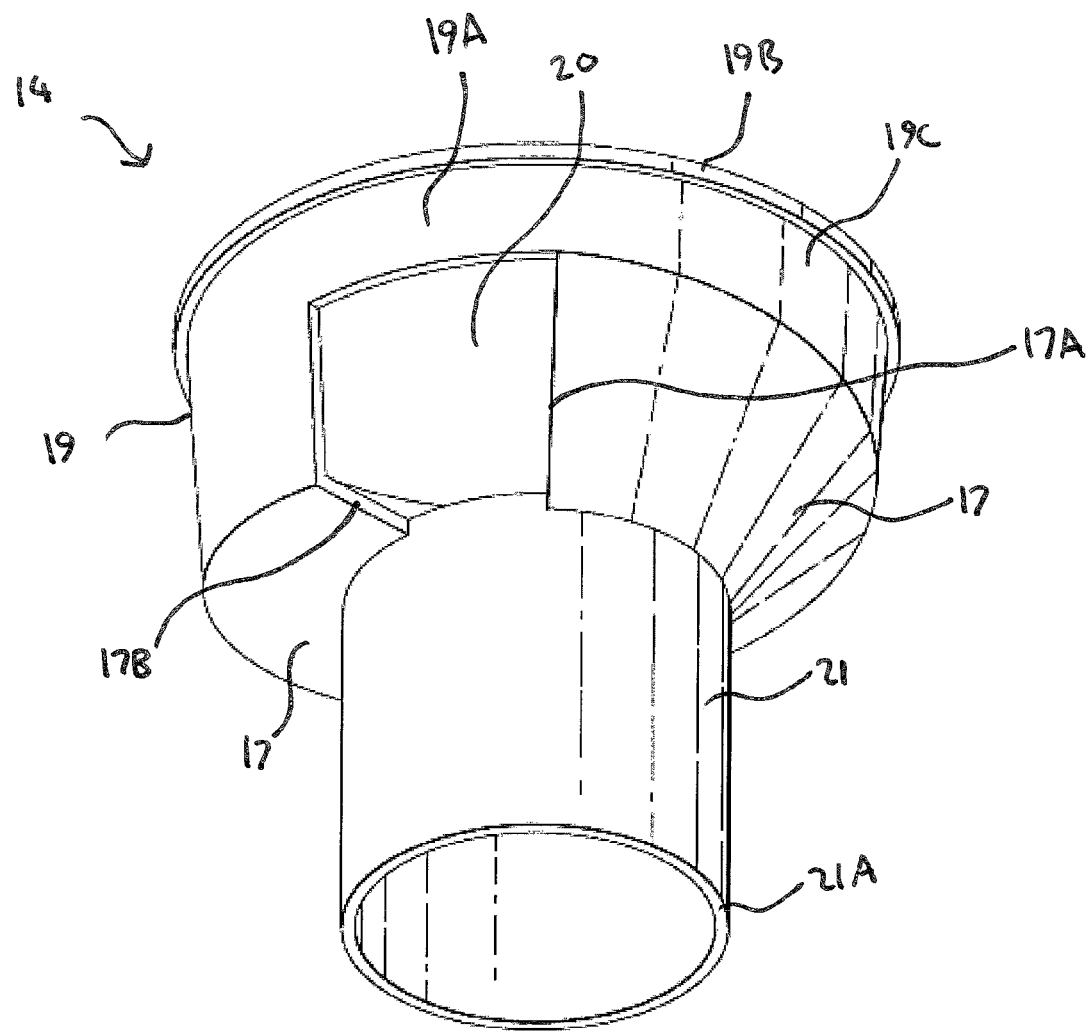
FIG. 6 is a perspective view of the separation device of FIG. 4.

Referring now to FIGS. 1 to 3, a known cyclonic separator 1 for a vacuum cleaner is shown. The cyclonic separator 1 comprises a cyclone housing 2, dust bin 3 and separation device 4.

The cyclone housing 2 has an open end and comprises a generally cylindrical peripheral wall 2A that surrounds a cyclone chamber 5. The dust bin 3 has an open end and comprises a generally cylindrical peripheral wall 3A that surrounds a collection chamber 6. The open end of the cyclone housing 2 is positioned proximate to the open end of the dust bin 3 such that the cyclone chamber 5 and collection chamber 6 are arranged coaxially. The separation device 4 is positioned proximate to the open ends of the cyclone housing 2 and dust bin 3 such that the cyclone chamber 5 is separated from the collection chamber 6 by the separation device 4. In use, the cyclone housing 2 is positioned substantially above the dust bin 3.

The separation device 4 comprises a cylindrical support member 7 and a guide member 8. The guide member 8 of the separation device 4 comprises a leading end 8A and a trailing end 8B, which each extend radially from the support member 7. The guide member 8 comprises a helical guide surface 8C that extends from the leading end 8A to the trailing end 8B about the central axis of the support member 7 guide surface. The guide member 8 extends 360 degrees about the support member 7 such that the leading end 8A overlies the trailing end 8B of the guide member 8 in the axial direction of the cyclone chamber 5. Therefore, when the separation device 4 is positioned between the cyclone housing 2 and dust bin 3, there is no line-of-sight between the cyclone chamber 5 and collection chamber 6. A flow path 9 is formed between the leading end 8A and the trailing end 8B of the guide member 8. The flow path 9 allows for air to flow between the leading end 8A and trailing end 8B of the guide member 8 in the tangential direction of the cyclone chamber 5 and therefore fluidly communicates the cyclone chamber 5 with the collection chamber 6.

An air inlet 2B is provided in the peripheral wall 2A of the cyclone housing 2 and is positioned distal to the open end of the cyclone housing 2. An air outlet 2C is provided in the end of the cyclone housing 2 that is distal to the open end. The air outlet 2C is positioned proximate to the central axis of the cyclone chamber 5.

The air inlet 2B is angled obliquely to the central axis of the cyclone chamber 5 such that when air is sucked into the cyclone chamber 5 through the air inlet 2B, due to operation of a suction generating means (not shown) of the cyclonic separator 1, the air entering the cyclone chamber 5 will flow in a helical path towards the open end of the cyclone housing 2. When the air enters the cyclone chamber 5 from the air inlet 2B the velocity of the air will decrease, due to the increase in volume of the cyclone chamber 5 relative to the air inlet 2B. Therefore, high density debris, for example, sand or mud particles, will have insufficient momentum to remain entrained in the airflow and instead will fall towards the open end of the cyclone housing 2 under the effect of gravity.

The helical path of the airflow in the cyclone chamber 5 causes a centrifugal force to be exerted on any remaining dirt and debris entrained in the airflow, for example, low density debris such as hair or fluff, resulting in said dirt and debris being urged against the inside surface of the peripheral wall 2A of the cyclone housing 2. When dirt and debris entrained in the airflow in the cyclone chamber 5 contacts the peripheral wall 2A of the cyclone housing 2 the kinetic energy of the dirt and debris is reduced. This causes such dirt and debris to have insufficient momentum to remain entrained in the airflow in the cyclone chamber 5 and so said dirt and debris falls towards the open end of the cyclone housing 2 under the effect of gravity.

Since there is no line-of-sight through the separation device 4 between the cyclone chamber 5 and the collection chamber 6 in the axial direction of the cyclone chamber 5, the dirt and debris that fall towards the separation device 4 are deposited on the guide surface 8C of the guide member 8.

When the airflow in the cyclone chamber 5 reaches the open end of the cyclone housing 2, it comes into contact with the separation device 4. A portion of the airflow that comes into contact with the separation device 4 is deflected away from the separation device 4 and travels back through the cyclone chamber 5 in the axial direction thereof. This portion of the airflow, from which the dirt and debris have been removed in the manner previously described, then flows out of the air outlet 2C and vents to atmosphere. The remaining portion of the airflow that comes into contact with the separation device 4 forms a 'secondary airflow' that follows the guide surface 8C such that the air flows in a helical path towards the trailing end 8B of the guide member 8. When the secondary airflow reaches the trailing end 8B of the guide member 8, it follows the flow path 9 in the separation device 4 and flows into the collection chamber 6.

Any dirt and debris that have been removed from the airflow in the cyclone chamber 5 and have collected on the guide surface 8C of the separation device 4 will be entrained in the secondary airflow passing over the guide surface 8C and draw into the collection chamber 6.

When the secondary airflow passes the leading end 8A of the guide member 8 and flows into the collection chamber 6, high density debris entrained in the secondary airflow will fall towards the end of the collection chamber 6 that is distal to the separation device 4 under the effect of gravity. Meanwhile, low density debris will remain entrained in the secondary airflow entering the collection chamber 6 and will follow a helical path around the central axis of collection chamber 6 in a direction away from the separation device 4.

The helical path of the secondary airflow in the collection chamber 6 causes a centrifugal force to be exerted on any dirt and debris entrained in the secondary airflow, which results in said dirt and debris being urged against the inside surface of the peripheral wall 3A of the dust bin 3 such that the kinetic energy of said dirt and debris is reduced. This causes said dirt and debris to fall towards the end of the collection chamber 6 that is distal to the separation device 4.

The secondary airflow that enters the collection chamber 6 will travel in a helical path in the axial direction of the collection chamber 6 away from the separation device 4, before reversing direction axially and travelling back towards the separation device 4. The secondary airflow will then flow back into the cyclone chamber 5, via the flow path 9, and out of the air outlet 2C. The secondary airflow in the collection chamber 6 that is passing back into the cyclone chamber 5 should be substantially free from dirt and debris to ensure that dirt and debris do not flow out of the air outlet 2C. The dirt and debris that are removed from the secondary airflow are collected in the collection chamber 6 at the end of the dust bin 3 that is distal to the separation device 4. The collected dirt and debris may later be removed from the dust bin 3 by a user and disposed of.

The secondary airflow travelling from the cyclone chamber 5 to the collection chamber 6 via the flow path 9 is referred to as the 'air inflow' and the secondary airflow travelling from the collection chamber 6 to the cyclone chamber 5 via the flow path 9 is referred to as the 'air outflow'. The air outflow flows proximate to the central axis of the collection chamber 6. The air inflow flows proximate to the peripheral wall 3A of the dust bin 3. Therefore, if the flow path 9 is viewed in cross-section, the air inflow is positioned between the air outflow and the peripheral wall 3A of the dust bin 3.

The velocity of the air inflow is greater than the velocity of the air outflow. This is due to secondary airflow expanding as it enters the relatively large volume of the collection chamber 6 and also frictional losses when the airflow contacts the peripheral wall 3A of the dust bin 3. Since the mass flow rate of the air inflow and air outflow must be equal, the reduced velocity of the air outflow relative to the air inflow results in the air outflow having a greater cross-sectional area than the air inflow.

It has been found that larger dirt and debris, and, in particular, low density debris, entrained in the air inflow may be influenced by the air outflow and rotated and moved in the radial direction of the separation device 4 into the air outflow. This can result in the larger dirt and debris becoming entrained solely in the air outflow, at which point they will flow into the cyclone chamber 5. This is undesirable since such dirt and debris will then be exhausted through the air outlet 2C.

Referring now to FIGS. 4 to 8, a cyclonic separator 10 for a vacuum cleaner according to an embodiment of the invention is shown. The cyclonic separator 10 comprises a vortex finder 11, cyclone housing 12, dust bin 13 and separation device 14.

The cyclone housing 12 has an open end and comprises a generally cylindrical peripheral wall 12A that surrounds a cyclone chamber 15. The dust bin 13 has an open end and comprises a generally cylindrical peripheral wall 13A that is tapered in diameter in the axial direction away from the open end of the dust bin 13. The peripheral wall 13A of the dust bin 13 surrounds a collection chamber 16. The open end of the cyclone housing 12 is positioned proximate to the open end of the dust bin 13 such that the cyclone chamber 15 and collection chamber 16 are arranged coaxially.

The separation device 14 is positioned proximate to the open ends of the cyclone housing 12 and dust bin 13 such that the separation device 14 extends into the dust bin 13 and is located between the cyclone chamber 15 and the collection chamber 16. In use, the cyclone housing 12 is positioned substantially above the dust bin 13.

The separation device 14 comprises a guide member 17, support member 18, peripheral wall 19 and flow path 20. The guide member 17 is integrally formed with the support member 18 and peripheral wall 19.

The support member 18 comprises a circular disc that is aligned normal to the central axis of the cyclone chamber 15. The diameter of the support member 18 is smaller than the diameter of the cyclone chamber 15 and collection chamber 16.

The guide member 17 extends radially from the periphery of the support member 18 and extends to the peripheral wall 13A of the dust bin 13. The guide member 17 extends continuously 315 degrees about the circumference of the support member 18. The guide member 17 comprises a leading end 17A and a trailing end 17B, which are distal to each other. The separation device 14 comprises a central axis X-X. The leading end 17A of the guide member 17 extends from the support member 18 in a direction towards the cyclone housing 12 at an angle α of 45 degrees to the central axis X-X of the separation device 14. The trailing end 17B of the guide member 17 extends radially from the support member 18 in a direction perpendicular to the central axis X-X of the separation device 14.

The guide member 17 comprises a guide surface 17C that extends between the leading end 17A and the trailing end 17B of the guide member 17 such that the angle of the guide surface 17C with respect to the central axis X-X of the separation device 14 increases from the leading end 17A to the trailing end 17B. Therefore, the guide surface 17C of the guide member 17 is sloped with respect to the central axis X-X of the separation device 14, with the peripheral edge of the guide member 17 that is distal to the support member 18 following a helical path about the central axis X-X so as to impart a helical flow direction on air flowing over the guide surface 17C. Since the angle of the guide surface 17C with respect to the central axis X-X of the separation device 14 increases from the leading end 17A to the trailing end 17B of the guide member 17, the separation device 14 can be configured such that the portions of the leading and trailing ends 17A, 17B that extend from the support member 18 overlap in the axial direction of the cyclone chamber 15. This allows for the separation device 14 to take up less space in the axial direction of the collection chamber 16 than the known separation device 4 described above. Furthermore, the separation device 14 can be arranged such that there is a relatively small axial displacement of at least a portion of the guide surface 17C about the central axis X-X from the leading end 17A to the trailing end 17B of the guide member 17 in comparison to the guide surface 8C of the known separation device 4 described above. This is advantageous since the air flow at the end of the cyclone chamber 15 that is proximate to the separation device 14 will follow a helical path that has a relatively small pitch and therefore the guide surface 17C can be arranged to correspond to this helical path such that disruption to the secondary airflow flowing through the separation device 14 is reduced.

Figure 7:
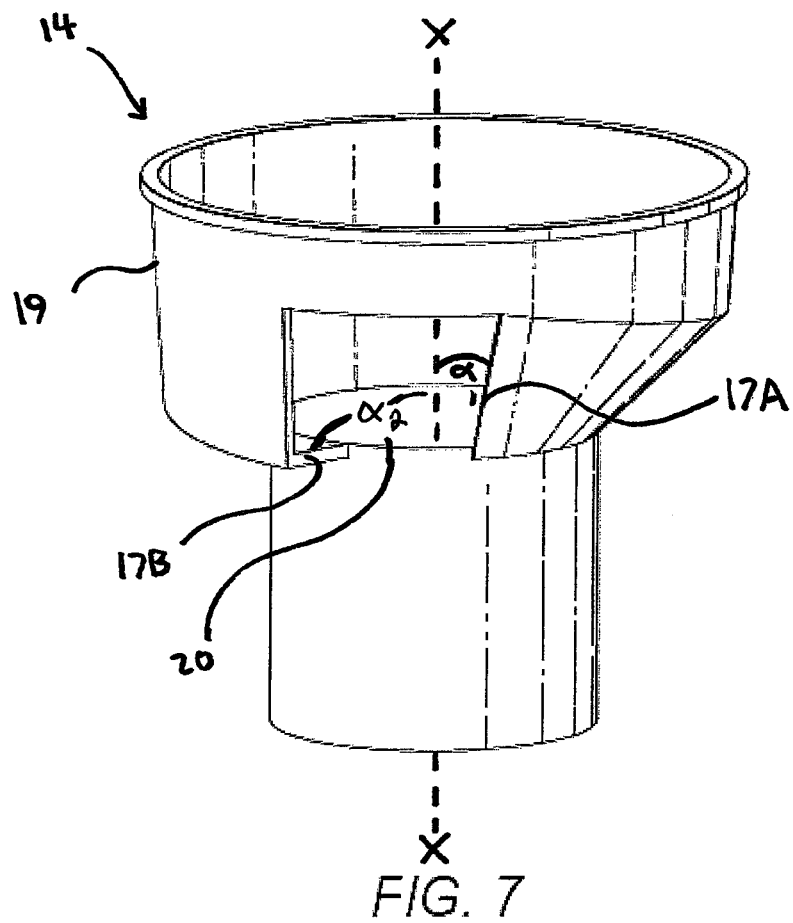
FIG. 7 is an alternative perspective view of the separation device of FIG. 4.
Figure 8:
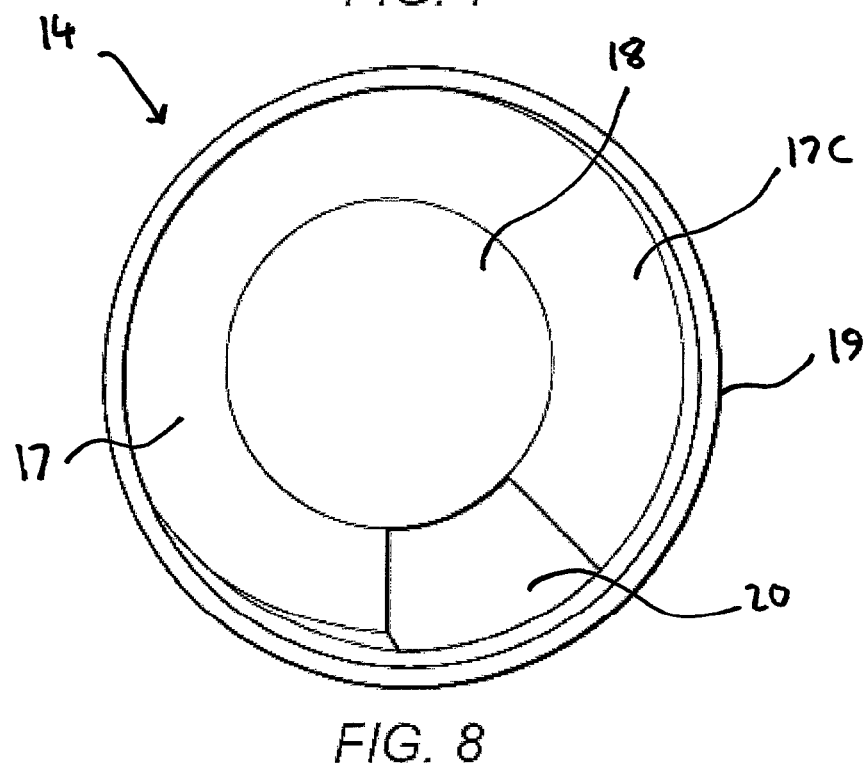
FIG. 8 is a top view of the separation device of FIG. 4.

The peripheral wall 19 of the separation device 14 comprises a continuous ring portion 19A with a lip 19B extending radially outwardly from a first end thereof. The lip 19B engages with the peripheral wall 13A of the dust bin 13 to hold the separation device 14 in position in the cyclonic separator 10. A connecting portion 19C extends from a second end of the ring portion 19A, distal the first end, and extends to the peripheral edge of the guide member 17 that is distal to the support member 18. The length of the connecting portion 19C in the axial direction of the collection chamber 16 increases from the leading end 17A to the trailing end 17B of the guide member 17. This is to accommodate the increasing angle α of the guide surface 17C with respect to the central axis X-X of the separation device 14 from a first value $\alpha_1$ at the leading end 17A to a second value $\alpha_2$ at the trailing end 17B, as shown in FIG. 7, which results in an increasing distance between the peripheral edge of the guide member 17 and the continuous ring portion 19A.

The outside surface of the peripheral wall 19 of the separation device 14 sits flush against the inside surface of the peripheral wall 13A of the dust bin 13. Therefore, the separation device 14 is constrained from tilting relative to the central axis of the cyclone chamber 15.

Since the guide member 17 extends less than 360 degrees about the central axis X-X of the separation device 14, line-of-sight is established between the cyclone chamber 15 and the collection chamber 16 in the axial direction of the cyclone chamber 15.

The arrangement of the flow path 20 allows for secondary airflow to flow through the separation device 14 in the tangential direction of the cyclone chamber 15. Since the leading end 17A of the guide member 17 is at an angle α of 45 degrees to the central axis X-X of the separation device 14, the flow path 20 has a generally triangular shaped cross-sectional area.

An air inlet 12B is provided in the peripheral wall 12A of the cyclone housing 12 and is positioned distal to the open end of the cyclone housing 12. An air outlet 12C is provided in the end of the cyclone housing 12 that is distal to the open end. The air outlet 12C is positioned proximate to the central axis of the cyclone chamber 15. The vortex finder 11 is disposed over the air outlet 12C.

The air inlet 12B is angled obliquely to the central axis of the cyclone chamber 15 such that when air is sucked into the cyclone chamber 15 through the air inlet 12B, due to operation of a suction generating means (not shown) provided downstream of the air outlet 12C, the air entering the cyclone chamber 15 will flow in a helical path towards the open end of the cyclone housing 12.

When the air enters the cyclone chamber 15 from the air inlet 12B, the velocity of the air will decrease, due to the increase in volume of the cyclone chamber 15 relative to the air inlet 12B. Therefore, high density debris will have insufficient momentum to remain entrained in the airflow and instead will fall towards the open end of the cyclone housing 12 under the effect of gravity. Furthermore, the helical path of the airflow in the cyclone chamber 15 causes a centrifugal force to be exerted on any remaining dirt and debris entrained in the airflow, for example, low density debris such as hair or fluff, which results in the dirt and debris being urged against the inside surface of the peripheral wall 12A of the cyclone housing 12 such that the kinetic energy of said dirt and debris is reduced. This results in said dirt and debris falling towards the separation device 14 under the effect of gravity.

The majority of the dirt and debris that has been removed from the airflow in the cyclone chamber 15 and falls towards the separation device 14 under the effects of gravity will be deposited on the guide surface 17C of the guide member 17. However, since the guide member 17 extends less than 360 degrees about the central axis X-X of the separation device 14, some of the dirt and debris will fall through the gap between the leading end 17A and trailing end 17B, where the guide member 17 does not extend from the support member 18, and will be collected in the collection chamber 16, rather than being deposited on the guide surface 17C of the guide member 17. This is advantageous since the dirt and debris are more quickly removed from the cyclone chamber 15 than if they are first deposited on the separation device 14 and so the efficiency of the cyclonic separator 10 is improved.

When the airflow in the cyclone chamber 15 reaches the open end of the cyclone housing 12, it comes into contact with the guide surface 17C of the separation device 14. A portion of the airflow that comes into contact with the guide surface 17C will be deflected away from the separation device 14 and flow back through the cyclone chamber 15 and out of the air outlet 12C to vent to atmosphere. The remaining portion of the airflow that comes into contact with the separation device 14 will form a 'secondary airflow' that flows over the guide surface 17C. The secondary airflow will follow a generally helical path and will flow in the direction from the leading end 17A to the trailing end 17B of the guide member 17. Any dirt and debris that have previously been removed from the airflow in the cyclone chamber 15 and have collected on the guide surface 17C of the separation device 14 will become entrained in the secondary airflow passing over the guide member 17 and so will be urged towards the trailing end 17B.

When the secondary airflow travelling over the guide surface 17C flows over the trailing end 17B of the guide member 17 and into the collection chamber 16, high density debris entrained in the secondary airflow will fall through the gap between the leading end 17A and trailing end 17B of the guide member 17 under the effect of gravity and will fall to the end of the collection chamber 16 that is distal to the separation device 14. Therefore, since the guide member 17 extends at a first angle of less than 360 degrees around the periphery of the support member 18, the high density dirt and debris will pass over the trailing end 17B of the separation device 14 and be separated from the secondary airflow due to the effect of gravity quicker than the separation device 4 of the known cyclonic separator 1. Therefore, the separation device 14 of the cyclonic separator 10 of the present invention allows for a quicker and more effective collection of high density dirt and debris than the prior art.

The secondary airflow, and any low density debris entrained therein, will flow over the trailing end 17B and into the collection chamber 16 via the flow path 20. When the secondary airflow enters the collection chamber 16, it will follow a helical path in the axial direction away from the separation device 14.

The helical path of the secondary airflow in the collection chamber 16 causes a centrifugal force to be exerted on any dirt and debris entrained in the secondary airflow, which results in the dirt and debris being urged against the inside surface of the peripheral wall 13A of the dust bin 13 such that the kinetic energy of said dirt and debris is reduced. Therefore, said dirt and debris fall towards the end of the collection chamber 16 that is distal to the separation device 14.

The secondary airflow that enters the collection chamber 16 will travel in a helical path in the axial direction of the collection chamber 16 away from the separation device 14, before reversing direction axially and travelling back towards the separation device 14. The secondary airflow will then flow back into the collection chamber 16, via the fluid path 20, and out of the air outlet 12C. The secondary airflow in the collection chamber 16 that is passing back into the cyclone chamber 15 is substantially free from dirt and debris, which are collected in the collection chamber 16 at the end of the dust bin 13 that is distal to the separation device 14. The secondary airflow that flows back into the cyclone chamber 15 is then exhausted through the air outlet 12C, via the vortex finder 11. The vortex finder 11 prevents larger debris, for example, strands of fabric or hair, that are not removed from the airflow in the cyclone chamber 15 from being exhausted through the air outlet 12C.

The secondary airflow travelling from the cyclone chamber 15 to the collection chamber 16 via the fluid path 20 is referred to as the 'air inflow' and the secondary airflow travelling from the collection chamber 16 to the cyclone chamber 15 via the fluid path 20 is referred to as the 'air outflow'. The air outflow travels proximate to the central axis of the collection chamber 16. The air inflow travels proximate to the peripheral wall 13A of the dust bin 13. Therefore, if the flow path 20 is viewed in cross-section, the air inflow is positioned between the air outflow and the peripheral wall 13A of the dust bin 13.

The velocity of the air inflow is greater than the velocity of the air outflow. This is due to the secondary airflow expanding as it enters the relatively large volume of the collection chamber 16 and also frictional losses when the secondary airflow contacts the peripheral wall 13A of the dust bin 13. Since the mass flow rate of the air inflow and air outflow must be equal, the reduced velocity of the air outflow relative to the air inflow results in the air outflow having a greater cross-sectional area than the air inflow.

It is important that the size of the area of the flow path 20 is not made too small since it must be a certain size to achieve a mass flow rate through the separation device 14 that promotes cyclonic flow in the cyclone chamber 15 and collection chamber 16. However, since the guide member 17 extends less than 360 degrees about the central axis X-X of the separation device 14, the secondary airflow can move through the flow path 20 in the axial direction of the cyclone chamber 15 as well as in the tangential direction thereof. Therefore, the radial extent of the flow path 20, which is the distance between the leading end 17A of the guide member 17 and the peripheral wall 13A of the dust bin 13, can be made smaller than the radial extent of the flow path 9 of the separation device 4 of the prior art, whilst achieving the same flowrate of secondary airflow from the cyclone chamber 15 to the collection chamber 16. Therefore, even in a case wherein larger dirt and debris entrained in the air inflow are influenced by the air outflow and rotated and moved in the radial direction of the separation device 14 into the air outflow, the smaller radial extent of the flow path 20 means that a portion of each of the larger debris will be in contact with the inflow. Furthermore, the triangular shape of the cross-section of the flow path 20 in the tangential direction of the cyclone chamber 15 results in the size of the cross-sectional area of the flow path 20 in the tangential direction being smaller in comparison to the rectangular shaped cross-section of the flow path 9 of the known separation device 4. The reduced size of the cross-sectional area of the flow path 20 in the tangential direction of the cyclone chamber 15 results in the air inflow also having a smaller cross-sectional area in the tangential direction. Therefore, when the air inflow enters the collection chamber 16 and meets the air in the collection chamber 16, which will have a lower velocity than the air inflow due to frictional losses between the air in the collection chamber 16 and the peripheral wall 13A of the dust bin 13, the reduced cross-section of the air inflow in the tangential direction of the collection chamber 16 will result in less energy being dissipated to the slower air in the collection chamber 16 and so the tangential velocity of the air entering the collection chamber 16 will be higher in comparison to the cyclonic separator 1 of the prior art. This is desirable since a large reduction in the tangential velocity of the air inflow can disrupt the helical flow path of the secondary airflow.

In one embodiment, the radial extent of the flow path 20 is 2 cm. However, it should be recognised that the radial extent of the flow path 20 may be a different size. It has been found a smaller radial extent of the flow path 20 results in smaller debris being prevented from flowing from the collection chamber 16 to the cyclone chamber 15.

The force exerted on each particle entrained in the airflow is characterised by Equation 1.

$$F=0.5\rho ACV^2 \qquad \text{Equation 1}$$

Where F is the force exerted on each piece of debris by the airflow, $\rho$ is the air density, A is the surface area of the debris that is in contact with the airflow, C is the aerodynamic coefficient of the debris, and V is the speed of the airflow relative to the speed of the debris.

The force exerted on each piece of debris entrained in the airflow is proportional to the surface area of the debris that is in contact with the airflow and the square of the velocity of the airspeed. Since the flow path 20 is configured such that a portion of each of the larger debris will always be in contact with the inflow, the larger dirt and debris will have a larger force exerted thereon by the inflow relative to the force exerted thereon by the outflow, which has a slower velocity than the inflow. Therefore, the larger debris will be urged into the collection chamber 16 by the secondary airflow and so will be prevented from passing back into the cyclone chamber 15 from the collection chamber 16. Therefore, the separation device 14 of the present invention allows for the cyclonic separator 10 to remove more large dirt and debris from the airflow than the cyclonic separator 1 of the prior art.

The separation device 14 has a blocking member 21 that comprises a tubular member 21A that extends from the support member 18 and extends in the axial direction into the collection chamber 16. The secondary airflow in the collection chamber 16 must travel about the periphery of the tubular member 21A and therefore the blocking member 21 encourages a cyclonic flow direction of the air in the collection chamber 16.

Although in the above described embodiment the leading end 17A of the guide member 17 extends from the support member 18 in a direction towards the cyclone housing 12 at an angle α of 45 degrees to the central axis X-X of the separation device 14, in alternate embodiments (not shown) the leading end extends at a different angle α between 30 degrees and 60 degrees to the central axis X-X.

Although in the above described embodiments the cyclonic separator 10 is described for use in a vacuum cleaner, it should be recognized that the cyclonic separator 10 may also be used in other applications, for example, an air filtration system or exhaust filtration system.

In the above described embodiments the separation device 14 has a diameter of 8 cm. However, it should be recognised that the separation device 14 of the above described embodiments may have an alternate diameter.

Although in the above described embodiments the guide member 17 extends continuously about 315 degrees of the circumference of the support member 18, in alternate embodiments (not shown) the guide member extends a different angle about the circumference of the support member.

It should be noted that the above-mentioned embodiments illustrate rather than limit the invention, and that those skilled in the art will be able to design many alternative embodiments without departing from the scope of the appended claims. It will be appreciated that the term "comprising" does not exclude other elements or steps, and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

The invention claimed is:

1. A separation device comprising:
   a cyclone chamber having a leading end and a trailing end;
   a collection chamber; and
   a guide surface for guiding debris entrained in an airflow in the cyclone chamber in a helical path about a central axis of the separation device and into the collection chamber,
   wherein the guide surface extends continuously about the central axis of the separation device to a first angle from the leading end to the trailing end of between 270 degrees and 340 degrees defining a flow path for allowing debris in the cyclone chamber to also pass into the collection chamber from the cyclone chamber in an axial direction of the separation device,
   wherein the guide surface is angled towards the cyclone chamber with respect to the central axis of the separation device such that the guide surface is sloped along a longitudinal direction of the separation device forming an angle a between the guide surface and the central axis of the separation device that continuously increases about the central axis of the separation device in a direction from the leading end to the trailing end, and
   wherein the angle α at the leading end has a first value $\alpha_1$ between 30 degrees and 60 degrees and the angle α at the trailing end has a second value $\alpha_2$ greater than the first value $\alpha_1$.

2. The separation device according to claim 1, wherein at least a portion of the guide surface follows a substantially helical path about the central axis of the separation device.

3. The separation device according to claim 1, wherein the first value $\alpha_1$ of said angle a at the leading end is substantially 45 degrees.

4. The separation device according to claim 1, wherein the first value $\alpha_2$ of the angle α at the trailing end is substantially 90 degrees such that the trailing end extends substantially perpendicular to the central axis of the separation device.

5. The separation device according to claim 1, having an opening both in a radial direction for allowing debris entrained in an airflow that flows in a helical path about the central axis to exit the separation device, and in the axial direction for allowing debris to exit the separation device under the effect of gravity.

6. The separation device according to claim 1, further comprising a support member, and wherein the guide surface extends from a portion of a periphery of the support member.

7. The separation device according to claim 6, further comprising a blocking member that extends from the support member into the collection chamber.

8. The separation device according to claim 1, wherein the separation device comprises a peripheral wall.

9. The separation device according to claim 8, wherein the peripheral wall is configured to sit flush to a peripheral wall of the cyclone chamber and/or a peripheral wall of the collection chamber.

10. A cyclonic separator comprising a separation device, wherein the separation device comprises:
    a cyclone chamber having a leading end and a trailing end;
    a collection chamber; and
    a guide surface for guiding debris entrained in an airflow in the cyclone chamber in a helical path about a central axis of the separation device and into the collection chamber,
    wherein the guide surface extends continuously about the central axis of the separation device to a first angle from the leading end to the trailing end of between 270 degrees and 340 degrees defining a flow path for allowing debris in the cyclone chamber to also pass into the collection chamber from the cyclone chamber in an axial direction of the separation device,
    wherein the guide surface is angled towards the cyclone chamber with respect to the central axis of the separation device such that the guide surface is sloped along a longitudinal direction of the separation device forming an angle a between the guide surface and the central axis of the separation device that continuously increases about the central axis of the separation device in a direction from the leading end to the trailing end, and
    wherein the angle α at the leading end has a first value $\alpha_1$ between 30 degrees and 60 degrees and the angle α at the trailing end has a second value $\alpha_2$ greater than the first value $\alpha_1$.

11. A vacuum cleaner comprising a cyclonic separator having a separation device, a cyclone chamber and a collection chamber, wherein the separation device comprises:
    a leading end;
    a trailing end; and
    a guide surface for guiding debris entrained in an airflow in the cyclone chamber in a helical path about a central axis of the separation device and into the collection chamber,
    wherein the guide surface extends continuously about the central axis of the separation device to a first angle from the leading end to the trailing end of between 270 degrees and 340 degrees defining a flow path for allowing debris in the cyclone chamber to also pass into the collection chamber from the cyclone chamber in an axial direction of the separation device, wherein the guide surface is angled towards the cyclone chamber with respect to the central axis of the separation device such that the guide surface is sloped along a longitudinal direction of the separation device forming an angle a between the guide surface and the central axis of the separation device that continuously increases about the central axis of the separation device in a direction from the leading end to the trailing end, and wherein the angle $\alpha$ at the leading end has a first value $\alpha_1$ between 30 degrees and 60 degrees and the angle $\alpha$ at the trailing end has a second value $\alpha_2$ greater than the first value $\alpha_1$.

12. The vacuum cleaner according to claim 11, wherein at least a portion of the guide surface follows a substantially helical path about the central axis of the separation device.

13. The vacuum cleaner according to claim 11, wherein the first value $\alpha_1$ of said angle $\alpha$ at the leading end is substantially 45 degrees.

14. The vacuum cleaner according to claim 11, wherein the first value $\alpha_2$ of the angle $\alpha$ at the trailing end is substantially 90 degrees such that the trailing end extends substantially perpendicular to the central axis of the separation device.

15. The vacuum cleaner according to claim 11, having an opening both in a radial direction for allowing debris entrained in an airflow that flows in a helical path about the central axis to exit the separation device, and in the axial direction for allowing debris to exit the separation device under the effect of gravity.

16. The vacuum cleaner according to claim 11, wherein the first angle is 315 degrees and the guide surface extends continuously about the central axis of the separation device to the first angle of 315 degrees.

17. The vacuum cleaner according to claim 11, further comprising a support member, and wherein the guide surface extends from a portion of a periphery of the support member.

18. The vacuum cleaner according to claim 17, further comprising a blocking member that extends from the support member into the collection chamber.

19. The vacuum cleaner according to claim 11, wherein the separation device comprises a peripheral wall.

20. The vacuum cleaner according to claim 19, wherein the peripheral wall is configured to sit flush to a peripheral wall of the cyclone chamber and/or a peripheral wall of the collection chamber.

* * * * *